United States Patent [19]

Lee et al.

[11] Patent Number: 5,591,007
[45] Date of Patent: Jan. 7, 1997

[54] MULTI-TIER TURBINE AIRFOIL

[75] Inventors: Ching-Pang Lee; Sundaresa V. Subramanian, both of Cincinnati; George A. Durgin, West Chester, all of Ohio

[73] Assignee: General Electric Company, Cincinnati, Ohio

[21] Appl. No.: 455,869

[22] Filed: May 31, 1995

[51] Int. Cl.⁶ .................................................. F01D 5/08
[52] U.S. Cl. ............................................... 416/97 R
[58] Field of Search .............................. 416/97 R, 96 R

[56] References Cited

U.S. PATENT DOCUMENTS

| | | | |
|---|---|---|---|
| 3,111,302 | 11/1963 | Bowmer | 416/97 |
| 3,533,711 | 10/1970 | Kercher | 416/90 |
| 3,656,863 | 4/1972 | DeFeo | 416/97 |
| 4,474,532 | 10/1984 | Pazder | 416/97 R |
| 4,627,480 | 12/1986 | Lee | 164/369 |
| 4,753,575 | 6/1988 | Levengood et al. | 416/97 |
| 4,818,178 | 4/1989 | Sibbertsen | 416/97 |
| 5,387,085 | 2/1995 | Thomas, Jr. et al. | 416/97 |

*Primary Examiner*—John T. Kwon
*Attorney, Agent, or Firm*—Andrew C. Hess; Patrick R. Scanlon

[57] ABSTRACT

A turbine airfoil includes a plurality of internal ribs defining at least two independent serpentine cooling circuits arranged in part in different longitudinal tiers, with an outer tier circuit being disposed in part longitudinally above an inner tier circuit for differentially longitudinally cooling the airfoil.

10 Claims, 1 Drawing Sheet

5,591,007

MULTI-TIER TURBINE AIRFOIL

BACKGROUND OF THE INVENTION

The present invention relates generally to gas turbine engines, and, more specifically, to cooling of turbine rotor blades and stator vanes therein.

A gas turbine engine includes a compressor that compresses air which is channeled to a combustor wherein it is mixed with fuel and ignited for generating combustion gases. The combustion gases flow downstream through one or more stages of turbines which extract energy therefrom for powering the compressor and producing additional output power for driving a fan for powering an aircraft in flight for example. A turbine stage includes a row of turbine rotor blades secured to the outer perimeter of a rotor disk, with a stationary turbine nozzle having a plurality of stator vanes disposed upstream therefrom. The combustion gases flow between the stator vanes and between the turbine blades for extracting energy to rotate the rotor disk. Since the combustion gases are hot, the turbine vanes and blades are typically cooled with a portion of compressor air bled from the compressor for this purpose. Diverting any portion of the compressor air from use in the combustor necessarily decreases the overall efficiency of the engine. Accordingly, it is desired to cool the vanes and blades with as little compressor bleed air as possible.

Typical turbine vanes and blades include an airfoil over which the combustion gases flow. The airfoil typically includes one or more serpentine cooling passages therein through which the compressor bleed air is channeled for cooling the airfoil. The airfoil may include various turbulators therein for enhancing cooling effectiveness, and the cooling air is discharged from the passages through various film cooling holes disposed around the outer surface of the airfoil.

The temperature profile of the combustion gases channeled over the airfoil is typically center peaked at about 50% to about 80% of the radial height or span of the airfoil. Secondary flow fields between adjacent airfoils may sometimes cause the temperature profile of the combustion gases to shift radially outwardly on the pressure side of the airfoil. Accordingly, the airfoil typically experiences relatively high heat input loading on its pressure side above the airfoil mid-span. Since the serpentine cooling circuits introduce air into the airfoil from its root, the cooling air must be provided with a suitable flow rate to ensure that the outer portions of the airfoil experiencing the greatest heat input are adequately cooled for obtaining a useful life during operation. The inner portions of the airfoil may therefore be over-cooled which is an inefficient use of the valuable compressor bleed air.

SUMMARY OF THE INVENTION

A turbine airfoil includes a plurality of internal ribs defining at least two independent serpentine cooling circuits arranged in part in different longitudinal tiers, with an outer tier circuit being disposed in part longitudinally above an inner tier circuit for differentially longitudinally cooling the airfoil.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 2:
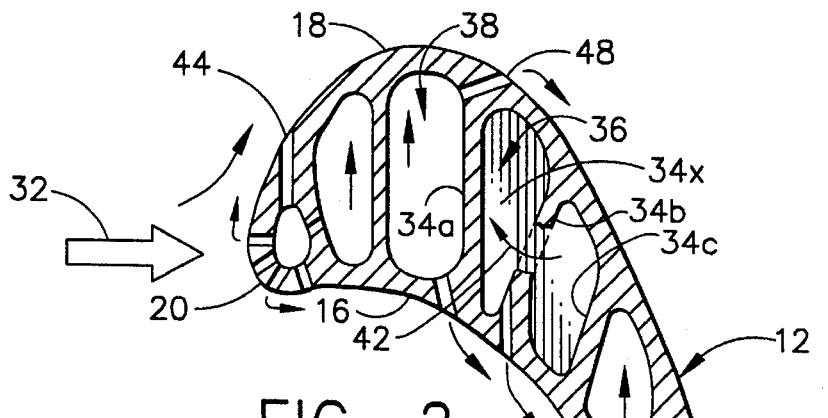
FIG. 2 is a sectional view through the airfoil of the blade illustrated in FIG. 1 and taken along line 2—2.
Figure 1:
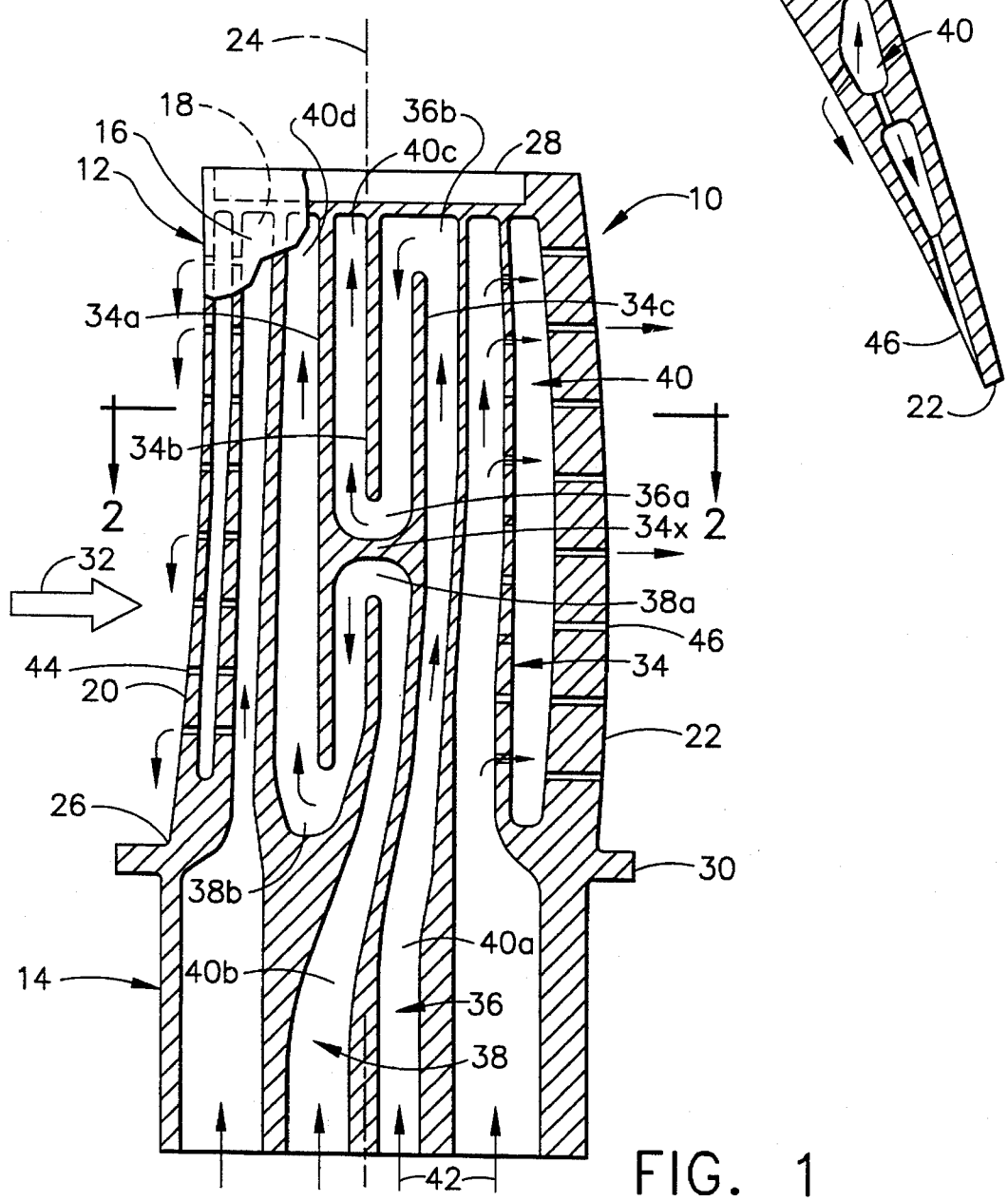
FIG. 1 is a sectional view of an exemplary gas turbine engine having an airfoil including multi-tier serpentine cooling circuits therein.

Illustrated in FIG. 1 is an exemplary turbine blade 10 for a gas turbine engine. The blade 10 includes an airfoil 12 and a conventional dovetail 14 which is used to conventionally secure the blade 10 to a rotor disk of the engine. A cross-section of the airfoil 12 is illustrated in FIG. 2 and shows that the airfoil 12 includes a first or pressure sidewall 16 and a second or suction sidewall 18 joined together along an upstream leading edge 20 and a downstream trailing edge 22 which is spaced axially or chordally therefrom.

As shown in FIG. 1, the airfoil 12 also extends longitudinally along a longitudinal or radial axis 24 in the direction of the span of the airfoil 12 from a radially inner root 26 to a radially outer tip 28. The root 26 is defined at a conventional platform 30 which forms the inner flow boundary of the airfoil 12 and below which extends the dovetail 14.

During operation of the blade 10, combustion gases 32 are generated by a combustor (not shown) and flow downstream over both airfoil sidewalls 16 and 18. The radial or longitudinal temperature profile of the combustion gases 32 typically is center-peaked near the mid-span region of the airfoil from about 50% to about 80% thereof. Secondary flow fields between adjacent ones of the airfoils 12 may cause the temperature profile to shift radially outwardly over the airfoil pressure sidewall 16 radially outwardly over a range of about 70% to about 85% of the radial height or span of the airfoil 12. Accordingly, the pressure sidewall 16 experiences its greatest heat input or load above the mid-span region in the 70% to 85% span height.

In accordance with the present invention, preferential radial or spanwise cooling of the airfoil 12 is effected to better match the distribution of the heat load thereto from the combustion gases 32. Although an exemplary gas turbine rotor blade 10 is illustrated in the Figures, the invention applies equally as well to turbine stator vanes having similar airfoils which may be similarly cooled in accordance with the present invention.

More specifically, the first and second sidewalls 16, 18 are spaced circumferentially or laterally apart from each other between the leading and trailing edges 20, 22 and are integrally joined together by a plurality of internal ribs indicated generally at 34 which define at least two independent serpentine cooling passages or circuits 36 and 38 arranged in part in differential longitudinal decks or tiers, with an outer serpentine tier circuit 36 being disposed in part longitudinally or radially above an inner serpentine tier circuit 38 for differentially longitudinally cooling the airfoil 12 to better match the applied heat loads from the combustion gases 32.

The several ribs 34 illustrated in FIG. 1 are primarily in the form of a plurality of chordally spaced apart and longitudinally extending first or span ribs, three of the seven illustrated being identified as 34a, 34b, and 34c, which ribs 34 define a plurality of discrete span channels indicated generally at 40 which extend longitudinally inside the airfoil 12 for channeling cooling air 42 conventionally received from a compressor (not shown) inside the airfoil 12 for the cooling thereof. The ribs 34 also include at least one chord rib 34x extending chordally from a left one 34a of the span ribs 34, through a center one 34b of the span ribs 34 to bifurcate the center rib 34b into outer and inner rib portions, with the chord rib 34x extending to a right one 34c of the span ribs 34. In the exemplary embodiment illustrated in FIG. 1, the center rib 34b extends longitudinally, with its outer portion being longitudinally aligned with its inner portion but spaced apart.

More specifically, the outer and inner portions of the center rib 34b are spaced longitudinally and generally perpendicularly from the chord rib 34x to define respective mid-span cross channels 36a and 38a disposed in flow communication with adjacent ones of the span channels 40 to define portions of the outer and inner tier circuits 36, 38. In the exemplary embodiment illustrated in FIG. 1, the outer tier circuit 36 is a three-pass serpentine circuit, and the inner tier circuit 38 is also a three-pass serpentine circuit. A major portion of the outer tier circuit 36 is disposed directly above a major portion of the inner tier circuit 38 so that the airfoil 12 may be preferentially cooled in its longitudinal or radial direction for better matching the applied heat input from the combustion gases 32 flowing over the airfoil 12 during operation. The outer and inner tier circuits 36, 38 may have any suitable number of serpentine passes as desired.

In the exemplary embodiment illustrated in FIG. 1, the three span ribs 4a,b,c which define in part the outer and inner tier circuits 36, 38 are disposed near the mid-chord region of the airfoil 12 between the leading edge 20 and the trailing edge 22 since experience has shown that the highest heat input in the airfoil 2 is in the mid-chord region near the blade tip 28 and on the first or pressure sidewall 16 for example. In this specific embodiment, the chord rib 34x is disposed at about mid-span of the airfoil 12, or at about 50% of the radial height. As indicated above in the Background section, the center-peaked temperature profile for the combustion gases 32 along with any radial migration will effect a maximum temperature on the pressure sidewall 16 of the airfoil 12 in the range of about 70% to about 85% of the span height. Accordingly, by positioning the chord rib 34x at mid-span, the outer tier circuit 36 extends upwardly to the airfoil tip 28 to provide cooling air directly to this highest heat input region for maximum cooling of the airfoil in this region.

As shown in FIG. 1, the right span rib 34c is spaced from or radially below the airfoil tip 28 to define an outer cross channel 36b of the outer tier circuit 36 which is disposed upstream from the mid-span cross channel 36a thereof. The left span rib 34a is spaced from or radially above the airfoil root 26 to define an inner cross channel 38b of the inner tier circuit 38 which is disposed downstream from the mid-span cross channel 38a thereof. The outer tier circuit 36 further includes one of the span channels 40 which defines an inlet channel 40a extending radially upwardly to the outer cross channel 36b. The inner tier circuit 38 similarly includes another one of the span channels 40 defining an inlet channel 40b extending radially upwardly to the mid-span cross channel 38a thereof. Since the airfoil 12 in the exemplary embodiment illustrated in FIG. 1 receives the cooling air 42 from the dovetail 14, the inlet channels 40a and 40b of the outer and inner tier circuits 36, 38 extend in lower part parallel to each other to separately feed the cooling air 42 to both circuits 36 and 38.

The outer tier circuit 36 further includes another one of the span channels 40 defining an outlet channel 40c extending radially outwardly from the mid-span cross channel 36a thereof. The inner tier circuit 38 similarly includes another one of the span channels 40 defining an outlet channel 40d extending radially outwardly from the inner cross channel 38b thereof. The outlet channels 40c and 40d of the outer and inner tier circuits 36, 38 similarly extend in upper part parallel to each other and to the airfoil tip 28.

In the turbine blade embodiment illustrated in FIG. 1, the inlet channels 40a and 40b commence at a common plane below the airfoil root 26 inside the dovetail 14 for conventionally receiving the cooling air 42. The outlet channels 40c and 40d terminate at a common plane at the airfoil tip 28. In this way, the two tier circuits 36, 38 are generally coextensive in the longitudinal direction with the outer tier 36 primarily cooling the outer portion of the airfoil 12, with the inner tier circuit 38 primarily cooling the inner portion of the airfoil 12. Since less cooling is required below the blade mid-span, the cooling air 42 delivered to the inner tier circuit 38 may be reduced in amount to only that which is needed for accommodating the lower heat input loads in that region. And, the cooling air 42 introduced into the outer tier circuit 36 may be independently metered for providing a suitable amount of the cooling air 42 for accommodating the higher heat input loads in the upper region of the airfoil. In this way, the airfoil 12 may be preferentially cooled in the radial or longitudinal direction of the airfoil using less total cooling air 42 where permitted without overcooling those regions as would occur in the prior art. The cooling air 42 is therefore used more efficiently and less cooling air is bled from the compressor for increasing the overall efficiency of operation of the gas turbine engine.

The inner and outer tier circuits 36, 38 may therefore be used instead of a conventional multi-pass serpentine circuit for providing improved cooling of the airfoil 12. The airfoil 12 may include additional cooling channels as well known in the art. For example, the span channels 40 illustrated in FIG. 1 define additional auxiliary cooling channels disposed between the leading and trailing edges 20 and 22 and the outer and inner tier circuits 36, 38. Two of the span channels 40 define a conventional leading edge cooling circuit, and another two of the span channels 40 define a conventional trailing edge circuit. In both the leading and trailing edge cooling circuits, respective ones of the ribs 34 include apertures therethrough for feeding respective span channels 40 with the cooling air 42 prior to discharging the cooling air 42 therefrom through conventional leading edge film cooling holes 44 and trailing edge cooling holes 46. The cooling air 42 channeled through the inner and outer tier circuits 36, 38 may be discharged therefrom through conventional sidewall film cooling holes 48 as illustrated in FIG. 2.

The airfoil 12 may have any other conventional features for enhancing the cooling thereof such as turbulators or pins (not shown) which are well known in the art.

Although the invention has been described with respect to the exemplary turbine blade 10 illustrated in the Figures, it may also be used for turbine nozzle vanes which have similar airfoils which can benefit from preferential spanwise cooling thereof for better matching the radial applied temperature distribution from the combustion gases 32.

The multi-tier serpentine cooling arrangement described above provides advantages of preferential span-wise cooling for optimizing the usage of cooling air and to achieve a more desirable metal temperature distribution of the airfoil 12. Although three-pass serpentine circuits are illustrated in FIG. 1, a five-pass serpentine circuit may also be used for the outer circuit 36 depending on the design application and available cooling air pressure. The multi-tier serpentine cooling circuits 36, 38 may be readily manufactured using conventional casting techniques as are used for conventional multi-pass serpentine passages.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A turbine airfoil comprising:

first and second sidewalls joined together at chordally spaced apart leading and trailing edges and extending longitudinally from a root to a tip; and said sidewalls being spaced apart from each other between said leading and trailing edges and joined together by a plurality of internal ribs defining at least two independent serpentine cooling circuits arranged in part in different longitudinal tiers, with an outer tier circuit being disposed in part longitudinally above an inner tier circuit for differentially longitudinally cooling said airfoil.

2. An airfoil according to claim 1 wherein said ribs comprise:

a plurality of chordally spaced apart and longitudinally extending span ribs defining a plurality of span channels for channeling cooling air inside said airfoil; and a chord rib extending chordally from a left one of said span ribs, through a center one of said span ribs to bifurcate said center rib into outer and inner portions, and to a right one of said span ribs; and said outer and inner portions of said center rib are spaced longitudinally from said chord rib to define respective mid-span cross channels disposed in flow communication with adjacent ones of said span channels to define said outer and inner tier circuits.

3. An airfoil according to claim 2 wherein said outer tier circuit is a three-pass serpentine circuit, and said inner tier circuit is a three-pass serpentine circuit.

4. An airfoil according to claim 3 wherein:

said right span rib is spaced from said airfoil tip to define an outer cross channel of said outer tier circuit; and said left span rib is spaced from said airfoil root to define an inner cross channel of said inner tier circuit.

5. An airfoil according to claim 4 wherein:

said outer tier circuit includes an inlet channel extending to said outer cross channel thereof;

said inner tier circuit includes an inlet channel extending to said mid-span cross channel thereof; and said inlet channels of said outer and inner tier circuits extend in part parallel to each other.

6. An airfoil according to claim 5 wherein:

said outer tier circuit includes an outlet flow channel extending from said mid-span cross channel thereof;

said inner tier circuit includes an outlet channel extending from said inner cross channel thereof; and said outlet channels of said outer and inner tier circuits extend in part parallel to each other.

7. An airfoil according to claim 6 wherein said inlet channels of said outer and inner tier circuits commence at a common plane below said root, and said outlet channels thereof terminate at a common plane at said tip.

8. An airfoil according to claim 7 wherein said outer portion of said center rib is longitudinally aligned with said inner portion of said center rib.

9. An airfoil according to claim 7 further comprising auxiliary cooling channels disposed between said leading and trailing edges and said outer and inner tier circuits.

10. An airfoil according to claim 7 wherein said airfoil is an airfoil of a turbine rotor blade having a dovetail for mounting said blade to a rotor disk, and said inlet channels of said outer and inner tier circuits extend into said dovetail, and said chord rib is disposed at about mid-span of said airfoil.

* * * * *